D. I. COOKE.
CAR VENTILATING SYSTEM.
APPLICATION FILED JUNE 27, 1913.
1,145,868.
Patented July 6, 1915.
2 SHEETS—SHEET 1.
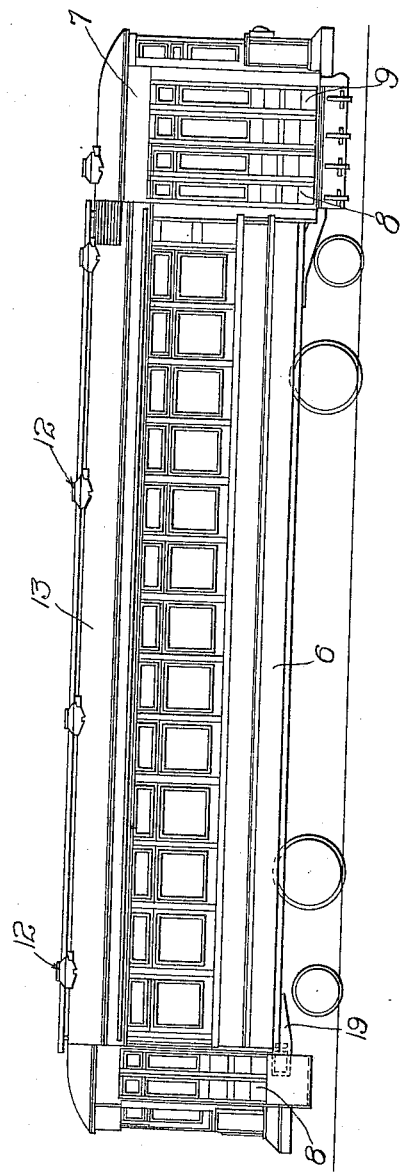
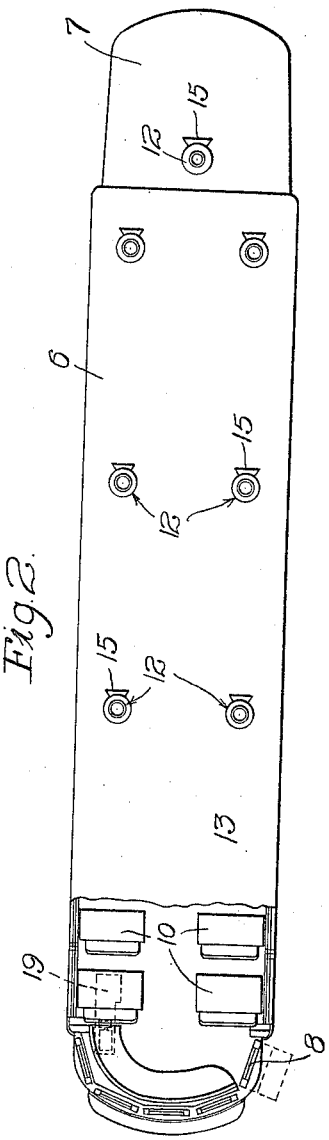

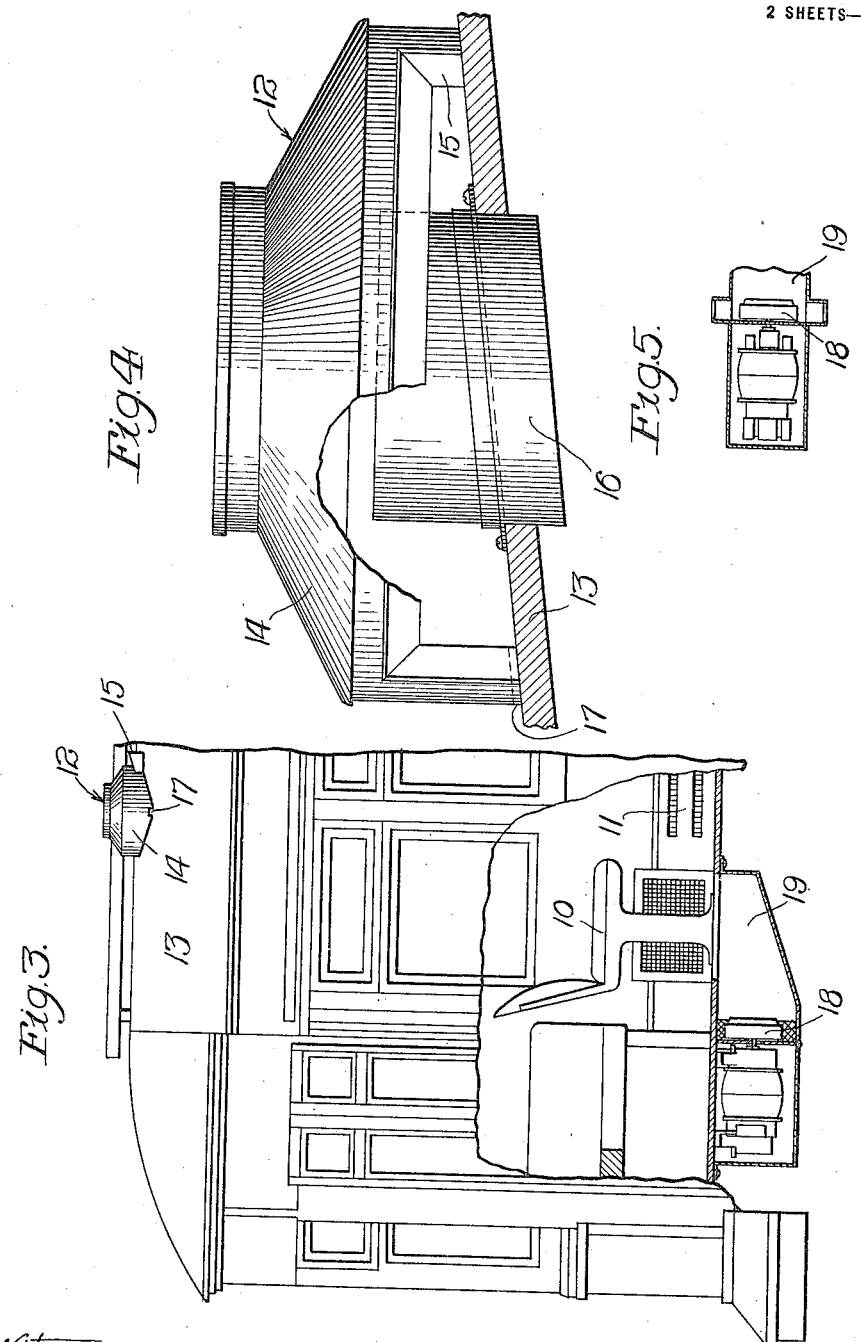

UNITED STATES PATENT OFFICE.

DWIGHT I. COOKE, OF CHICAGO, ILLINOIS, ASSIGNOR TO VACUUM CAR VENTILATING CO., OF CHICAGO, ILLINOIS, A CORPORATION OF ILLINOIS.

CAR-VENTILATING SYSTEM.

1,145,868. Specification of Letters Patent. Patented July 6, 1915.

Application filed June 27, 1913. Serial No. 776,053.

*To all whom it may concern:*

Be it known that I, DWIGHT I. COOKE, a citizen of the United States, residing at Chicago, in the county of Cook and State of Illinois, have invented certain new and useful Improvements in Car-Ventilating Systems, of which the following is a specification.

This invention relates to a ventilating system intended for use on cars and similar vehicles, and is particularly adapted to fulfil the requirements of ventilation in closed cars of the single-end-operated type.

In the present ventilating system, I aim to provide an adequate and even inflow of fresh air into the car body and a discharge of foul air therefrom in quantities, manner of distribution, and rate of flow which is conducive to the highest comfort and best health of the car passengers. It is further sought in this invention to arrange the operation of the ventilating system with reference to the average conditions of car speed, with reference to the location of the car heaters, and with reference to the leakage of air which is always present even in the closed type of car bodies.

As will appear from a study of the drawings and specification, the invention consists further in the features of construction and combination of parts as hereinafter described and claimed.

In the drawings: Figure 1 is a side elevation of a single-end-operated car, showing the location of the air intakes and means for discharging foul air from the car body; Fig. 2 is a plan view, partly in section, of the car body shown in Fig. 1; Fig. 3 is an enlarged elevation, partly in section, of the rear end of the car body; Fig. 4 is a front elevation, partly in section, of a suitable form of air intake; and Fig. 5 is a bottom view of the air discharging means.

The drawings illustrate an arch-roof car 6 of the single-end-operated type, wherein the controlling means for operation thereof are located on the front platform 7 which is provided with exit and entrance doors 8 and 9 respectively. An emergency exit 8 is also provided at the rear end of the car, but this is not intended to be used in the ordinary course of car operation.

In the type of car illustrated, most of the seats 10 are arranged transversely of the car to permit of the passengers riding face forward, and the location of the car heaters 11 in the drawings is shown as under the seats or along the side walls of the car close to the floor line. A series of air intakes 12 are arranged above the car roof 13, each consisting of a hood 14 closed over the top and provided with a flaring mouth 15 facing forwardly of the car through which air enters. Within the hood 14 is arranged a tube or duct 16 leading into the car body, and which, if preferred, may be supplied at its inner end with a damper or other suitable means to distribute the air entering the car. An opening 17 is arranged in one side of the hood to allow of the escape or draining of water which may enter through the mouth 15 of the hood 14 into the chamber therewithin.

In the type of car illustrated, means are shown for educting the vitiated or foul air from the car body consisting of an electrically-operated exhaust fan 18, which operates in a duct 19 communicating with the interior of the car body, as shown in Figs. 2 and 3, at a point preferably under one of the car seats 10. The controlling means (not shown) for the exhaust fan may be arranged upon the front platform within convenient reach of one of the car crew.

The ventilating action which results from a car so equipped is substantially as follows: During the periods of motion air is drawn through the intakes on the car roof and is delivered into the car body at different points above the heads of the passengers therein. The exhaust fan located at the rear end of the car below the floor line tends to direct all currents of air toward the rear and downward toward the floor, thus creating a positive rearward and downward movement of air throughout the car. When the car is stopped and the front exit or entrance door is opened the action of the air inlets on the car roof virtually ceases, due to the fact that a greater area is offered through the open door at the front end of the car through which fresh air may be supplied to the car and exhaust fan at the rear end thereof. At such a time, therefore, practically the entire quantity of fresh air supplied would be through the front door from whence it would be drawn rearward by the action of the exhaust fan.

During periods of cold weather when the car is operated with doors and windows closed, and with the heating system in operation, the warm air radiating from the heaters is delivered into the car body at points adjacent the car floor. The warm air tends naturally to rise to the upper level of the car where it is mixed with the currents of cold fresh air supplied to the car through the roof thereof, the rapidity of such mixture increasing with the difference between the car temperature and the temperature of the outside air. The mixture of cold and warm air thus resulting causes a more or less even strata of pure fresh tempered air to obtain throughout the mid-section of the car. This intermingling of warm and fresh air will take place substantially as has been described during the periods when the car is in motion. As has previously been explained, however, when the car is stopped and the front exit or entrance doors are open, the intake action of the roof inlets virtually ceases, because of the greater area opened up through which fresh air may pass in to the car.

The advantages of the system which has been described lies in the fact that fresh air is taken in at the roof line of the car where it is freest from dust and street impurities. The fresh air so admitted is furthermore delivered to the interior of the car at points closer to the breathing zone where the sensation of freshness, due to the introduction of cool air at the upper level, should preferably obtain. The floor of the car furthermore in the present system of ventilation is preserved the warmest in temperature, conducing thereby to the comfort of the feet of passengers. It may even be found on this account that it is practicable to reduce the car temperature without inconvenience.

In the installation of the system herein described, it is intended that the exhaust fan should remove a predetermined quantity of air sufficient to insure an air change taking place within a specified period of time. To this end the best practice would probably be to proportion the roof inlets to introduce fresh air equal to approximately one-half the exhaust fan capacity at the average operating speed of the car, leaving the balance of the fresh air handled by the fan to be supplied through the cracks and leaky openings. This arrangement serves also to diminish any chilling effect which would result when either of the front doors are opened if the entire quantity of air supplied to the fan for exhaustion were handled only through roof outlets during the operation of the car. In the present ventilating system moreover it is to be noted that the fresh air is drawn into the car from the roof and that it proceeds downwardly to be diffused and diluted by the upwardly rising currents of warm air proceeding from the heaters located at the floor line. This results in a reduction of the excess temperature previously existing at the upper deck section, and the distribution of a fairly even strata of tempered air throughout the middle section of the car body for its entire length. The above ventilating effects are produced, it will be observed, without the agency of any special ducts through which currents of air are often directed.

It is to be noted also that the system of ventilation herein described possesses very positive advantages in view of the movement of air longitudinally within the car which usually obtains during periods of acceleration and deceleration. In single end operated cars of the standard size and design, this air movement ordinarily results in a disturbance of the balance of pressure in the car body, such as to cause during deceleration (1) a strong suction effect or inward flow of air through any openings located at the rear end, (2) an outward flow of air at the front end as the car door is opened, and (3) an outward flow of air at the front end through cracks around windows or other openings situated in the car floor or roof. Moreover, with any abnormal increase in air pressure, the action of fresh air inspirators would tend to be reversed in the zone of increased pressure. These unsatisfactory conditions are largely eliminated in single end operated cars in which my ventilating system is employed to maintain in a longitudinal direction an even and constant circulation of air through the car interior under all operating conditions. It is contemplated that by the use of the exhaust fan arranged in the manner described, the direction of air flow will always be rearward regardless of whether the car be stationary, be accelerating, be in motion, or be decelerating.

I claim:

1. In combination with a closed car body, a ventilating system embodying air intakes at or near the car roof line arranged to admit air at different points into the car body when the car is in motion, a door at the forward end of the car body arranged to admit air therein when the car is at rest, and mechanically operated means located rearwardly of said door arranged to maintain a flow of vitiated air from the direction of said door and intakes through the car body both when the car is at rest and in motion, substantially as described.

2. In combination with a closed car body, a ventilating system embodying air intakes at or near the car roof line arranged to admit air at different points into the car body when the car is in motion, a door at the forward end of the car body arranged to admit air therein when the car is at rest, and mechanically operated means located rearwardly of said door at or near the car floor line arranged to maintain a flow of vitiated air from the direction of said door and intakes through the car body both when the car is at rest and in motion, substantially as described.

3. In combination with a closed car body, a car ventilating system including a door at the forward end of the car body communicating directly with the seating compartment therein, and designed to admit air therein when the car is at rest, and mechanically operated means located rearwardly of said door arranged to maintain a flow of vitiated air from the direction of said door through the car body both when the car is at rest and in motion, substantially as described.

4. In combination with a closed car body, a car ventilating system embodying air intakes at or near the car roof line arranged to admit air at different points into the car body when the car is in motion, said car having other means located at the forward end of the car body arranged to admit air directly into the seating compartment of the car body when the car is at rest, and mechanically operated means arranged to maintain a continuous flow of vitiated air through the car body located rearwardly of the forward air admission means whereby a positive and continuous current proceeding rearwardly from the forward air admission means is maintained at all times within the car body, substantially as described.

DWIGHT I. COOKE.

Witnesses:
EPHRAIM BANNING,
WM. P. BOND.

Copies of this patent may be obtained for five cents each, by addressing the "Commissioner of Patents, Washington, D. C."